Dec. 19, 1961  J. T. WHITE  3,013,440
COMPOSITE PLASTIC METAL GEAR AND METHOD OF MAKING SAME
Filed Dec. 14, 1959
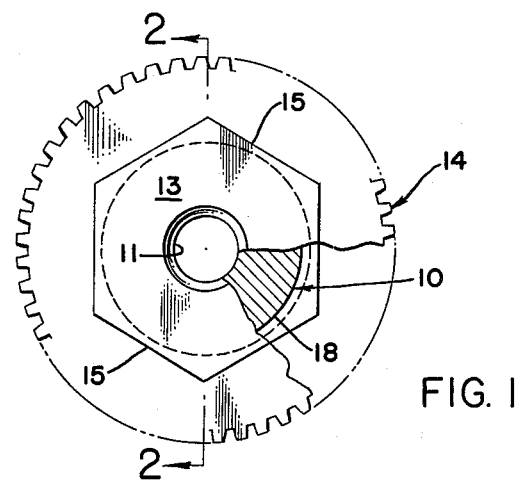
FIG. 1
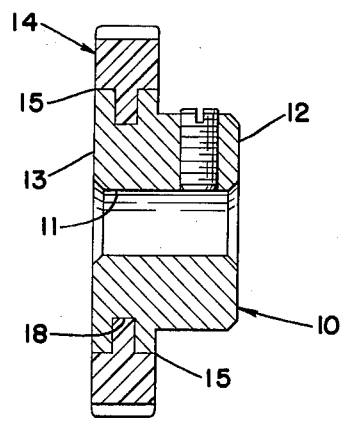
FIG. 2
FIG. 3
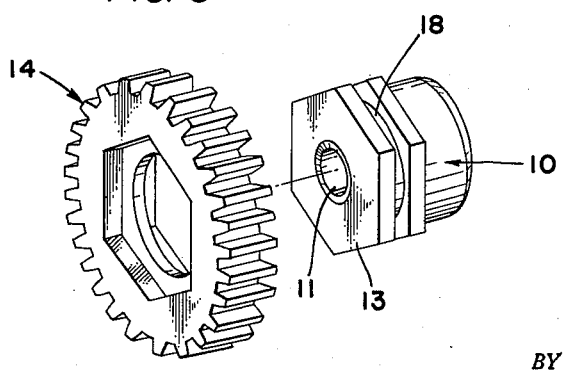
INVENTOR.
JOHN T. WHITE
BY
Fay & Fay
ATTORNEYS 3,013,440
COMPOSITE PLASTIC METAL GEAR AND
METHOD OF MAKING SAME
John T. White, 3007 Fontenay Road, Cleveland, Ohio
Filed Dec. 14, 1959, Ser. No. 859,518
5 Claims. (Cl. 74—446)

This invention, relating to a composite plastic metal gear, is particularly directed to a gear having mesh and teeth of nylon or suitable plastic, including elastomers, plastomers or comparable materials, and a metal gear hub therefor. This invention also incorporates the means for securing the plastic gear and metal gear hub together so that they can take a torque and not distort and slip. This invention is also directed to the method of making a gear and gear ub, which includes a composite plastic gear and metal gear hub from a polygonal, generally hexagonal, gear hub blank, there being a circumferential groove axially spaced along the gear hub.

The gear hubs are formed of metal, aluminum, stainless steel and bronze or brass products, and the nylon gears of this invention are cut on a hobbing or shaping machine or molded. The hexagonal gear blank is machined with a circumferential axial groove which is generally in the center and forming a cylindrical conformation so that the hexagonal members serve as a double row of teeth to provide torsional resistance for the nylon teeth and an axial groove to support the nylon teeth axially of the gear hub in order to prevent slippage along the gear hub.

This invention provides a novel combination of a nylon gear and gear hub and a means for securing the members together to withstand the torque movement from the gears to the gear hub and a limited amount of axial force.

An object of this invention is to provide a new and improved plastic gear having a metal hub and the means for uniting said members together.

A further object of this invention is to provide a new gear hub which is formed of metal and adapted to secure plastic and certain hard elastomer materials to the gear hub, said gear hub generally consisting of a polygonal stock that is machined with a circumferential grooved section for the purpose of securing the plastic gear and the metal gear hub against axial separation and to secure them to accept torque.

A still further object of this invention is to provide a new and improved method of making a gear hub that will securely bond a plastic gear thereto, providing an improved relationship in a gear for the meshing and forming characteristics of the plastic gear and teeth and for improving the frictional characteristics and rigidity of the metal hub.

Another object of this invention is to provide a new and improved method of making a gear including a plastic tooth section and a metal hub section which are securely bonded together to accept torque and axial forces.

To the accomplishment of the foregoing and related ends, said invention then consists of the means hereinafter fully described and particularly pointed out in the claims; the following description setting forth in detail one approved means of carrying out the invention, such disclosed means, however, constituting but one of the various ways in which the principle of the invention may be used.

In the drawings.

FIG. 1 is an end view of the gear and gear hub of my invention, with parts broken away; and FIG. 2 is a cross-sectional view of my new and improved gear and gear hub, taken on line 2—2 of FIG. 1;

FIG. 3 is an exploded perspective view.

Referring now more particularly to the drawings, 10 shows a gear hub having a generally cylindrical opening therethrough as at 11, and a pair of end faces 12 and 13 to accept axial torque or for mounting in suitable shafting equipment. The gear section proper is shown at 14 including an indeterminate number of teeth, the number of which is dependent upon the characteristics of the gear, and the intersection 15 between the plastic material. By plastic material in this instance, I means to include both plastomers and elastomers, particularly hard elastomers that are used in connection with composite plastic metal gears. This section generally includes a pair of axial ridges formed by the hexagonal teeth projecting radially from the hub. For example, as will be seen in connection with FIGS. 1 and 3, a hexagonal stock has been used and machined down by cutting a cylindrical section as seen at 18 over a short axial distance which has generally been centrally located on the external surface of the gear hub where the plastic gear is adapted to be secured.

There are a plurality of teeth or securing members projecting radially from the hub section into the plastic section to lock the plastic gear onto the hub so that it will accept varying amount of torsion. Since these sections are on both sides, the gear is securely bound to the hub with reduced chances of any spline or locking surface being severed. At the same time, there is a cylindrical section of plastic material which is held against the hexagonal teeth of the stock material so that the gear cannot slip axially with respect to the hub but can accept limited amounts of axial force. By this means a unitary gear hub is made that can firmly bind a plastic gear to the hub.

Generally, the gear blank is made by taking polygonal stock, hexagonal and possibly octagonal, although for lower torque loads, there is no reason why polygonal stock up to ten or twelve sides may not be used, but, generally, this would be from pentagonal to twelve sided polygons, particularly equal sided polygons, and the stock would be turned down over a central portion. The gear would be molded around the stock or pressed into position over a special fixture if the plastic had sufficient resiliency.

This invention then relates to the composite plastic metal gear and the subcombination of the gear hub itself which is of special construction together with the method of making the gear hub and the gear.

Although the present invention has been described in connection with a few preferred embodiments thereof, variations and modifications may be resorted to by those skilled in the art without departing from the principle of the invention. All of these variations and modifications are considered to be within the true spirit and scope of the present invention as disclosed in the foregoing description and defined by the appended claims.

I claim:

1. A gear comprising a gear tooth section and a gear hub, said gear hub being of generally polygonal conformation on one portion of the exterior side and of cylindrical conformation on the interior side thereof and having a pair of side faces axially along the hub, a junction between the polygonal gear hub and the gear tooth section, said gear tooth section consisting of a plastic gear in close fitting relationship to the polygonal gear hub so that torque loads may be transmitted between the gear hub and the gear tooth section, said hub further having a short section axially midway in the polygonal gear hub comprising a circumferential groove cylindrical in shape of lesser radii than the teeth of the polygon, whereby said plastic gear closely fits around the teeth of the polygon and in the circumferential groove to hold the same against displacement.

2. A composite plastic metal gear comprising a metal hub and a plastic tooth section, said hub having a polygonal portion with a circumferential groove around the polygonal hub of lesser diameter than the teeth of the polygonal hub section forming a groove to hold the plastic tooth section against axial movement with respect to the hub section, and a plastic tooth section diametrically outward from the hub section mating with said hub, whereby the polygonal hub accepts torque loads between the hub and the teeth.

3. A method of making a gear which consists of taking polygonal stock, cutting the stock to the axial length of the gear hub, machining a circumferential groove on the outer surface of the stock along the hub, forming a thermoplastic gear around said polygonal hub having the circumferential groove axially along the hub to secure the gear in a torque and axial force resistant connection on the hub.

4. A method of making a gear hub for securing to a thermoplastic gear which consists of taking polygonal stock, cutting said stock to the length of the hub, machining on the outer circumferential surface a cylindrical and circumferential groove therein along the outer surface, thus forming a multiplicity of thrust stopping surfaces on said polygon intersected by the circumferential groove.

5. A method of making a gear hub which consists of taking hexagonal stock, forming a central aperture axially therethrough, cutting the stock to the axial length of a gear hub, machining on the external surface of said stock a circumferential groove of lesser diameter with respect to said central aperture than the polygonal stock.

References Cited in the file of this patent

UNITED STATES PATENTS

| | | |
|---|---|---|
| 680,654 | Gomber | Aug. 13, 1901 |
| 737,223 | Grannis | Aug. 25, 1903 |
| 814,342 | Atha | Mar. 6, 1906 |
| 1,165,933 | Alquist | Dec. 28, 1915 |
| 1,235,734 | Stange | Aug. 7, 1917 |
| 1,524,555 | Kempton | Jan. 27, 1925 |
| 1,655,278 | Mansur | Jan. 3, 1928 |
| 1,666,576 | Lytle | Apr. 17, 1928 |
| 1,686,142 | Bonsieur | Oct. 2, 1928 |
| 1,761,114 | Frederick | June 3, 1930 |
| 2,129,257 | Bachmann | Sept. 6, 1938 |
| 2,444,880 | Robinson | July 6, 1948 |
| 2,679,913 | Scott | June 1, 1954 |